(12) United States Patent
Courtney et al.

(10) Patent No.: US 9,710,726 B2
(45) Date of Patent: Jul. 18, 2017

(54) CORRELATION USING OVERLAYED PATCHES

(71) Applicants: Allen Peter Courtney, Mooney Mooney (AU); Peter Alleine Fletcher, Rozelle (AU)

(72) Inventors: Allen Peter Courtney, Mooney Mooney (AU); Peter Alleine Fletcher, Rozelle (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/648,214

(22) PCT Filed: Nov. 26, 2013

(86) PCT No.: PCT/AU2013/001361
§ 371 (c)(1),
(2) Date: May 28, 2015

(87) PCT Pub. No.: WO2014/082119
PCT Pub. Date: Jun. 5, 2014

(65) Prior Publication Data
US 2015/0294190 A1    Oct. 15, 2015

(30) Foreign Application Priority Data
Nov. 30, 2012    (AU) ................ 2012258429

(51) Int. Cl.
G06K 9/62 (2006.01)
G06T 7/00 (2017.01)
H04N 1/387 (2006.01)

(52) U.S. Cl.
CPC .......... G06K 9/6255 (2013.01); G06T 7/0044 (2013.01); H04N 1/3876 (2013.01)

(58) Field of Classification Search
CPC ... G06K 9/6255; G06T 7/0044; H04N 1/3876
USPC .......................................................... 382/218
See application file for complete search history.

(56) References Cited

U.S. PATENT DOCUMENTS

| | | | |
|---|---|---|---|
| 7,822,237 B2 | 10/2010 | Fujii | |
| 2008/0031524 A1* | 2/2008 | Wenzel | ............ G06K 9/42 382/209 |
| 2011/0293146 A1 | 12/2011 | Grycewicz | |
| 2012/0020573 A1 | 1/2012 | Kacenjar | |

* cited by examiner

Primary Examiner — Amandeep Saini
(74) Attorney, Agent, or Firm — Canon USA, Inc. IP Division

(57) ABSTRACT

Disclosed is a computer implemented method for identifying a component tile within a target image. The method receives a plurality of distinct component tiles and overlays the plurality of component tiles to form an overlaid image. The overlaying is based on an embedded parameter value for each component tile. The method compares the target image with the overlayed image to determine a matching parameter value, and identifies a component tile within the target image by determining that the embedded parameter value of the component tile is the closest of the embedded parameter values to the matching parameter value.

22 Claims, 13 Drawing Sheets

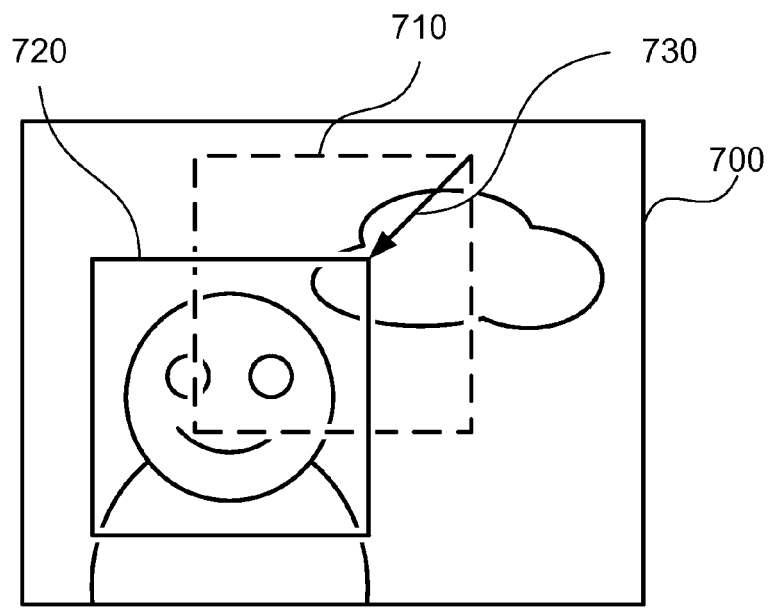
Fig. 7
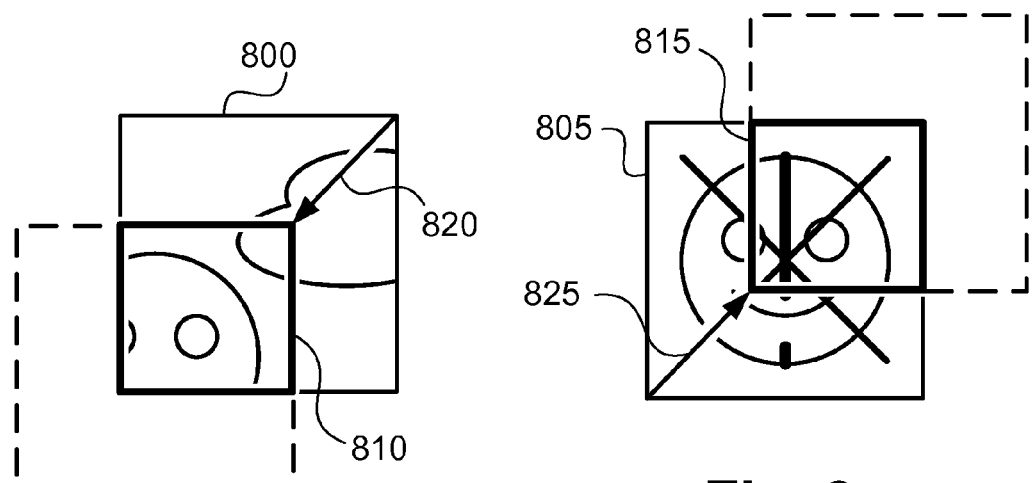
Fig. 8
Fig. 9

CORRELATION USING OVERLAYED PATCHES

REFERENCE TO RELATED PATENT APPLICATION(S)

This application claims the benefit under 35 U.S.C. §119 of the filing date of Australian Patent Application No. 2012258429, filed Nov. 30, 2012, hereby incorporated by reference in its entirety as if fully set forth herein.

TECHNICAL FIELD

The current invention relates to methods for the estimation of a relative shift between a first image and at least one other image from a collection of images. The invention further relates to using the estimated shift for the identification of an image, from a collection of patterns, substantially present within the first image.

BACKGROUND

Many applications require the measurement of relative spatial distortions between a two-dimensional image and a collection of two-dimensional images, where at least one image in the collection is expected to be similar to the first two-dimensional image. The collection of images will often be formed of faithful representations of original data, which may be called "reference" images. The image that the collection is measured against often is, or includes, a degraded representation of at least one of the reference images; this image to be measured against may be called the "target" image.

The degradation of the target image with respect to the reference images can take many forms. As examples, the target image may be:
 a printed and scanned version a reference image;
 a feature which has moved in a portion of a video sequence;
 obtained from a digital photograph captured under different conditions from a reference image; or
 a different image with a version of a reference image embedded in the different image as a watermark.

The terms "reference" and "target" can be interchanged for some applications, and there may not be differences in quality across all images. Sometimes the set of images may be taken from a single image, or from a series of images.

Degradation in quality can arise due to spatial distortion between the images. Estimating the distortion can provide for accommodation or correction of the distortion. The basis of many spatial distortion estimation methods is shift estimation, in which an estimate is made of the translation required of one image to best align that image with the other. Shift estimation can equally be performed between reference and target tiles extracted from the reference and target images respectively.

Several techniques have been used for such shift estimation, including correlation, phase correlation, least-squares fitting, and gradient-based shift estimation.

The correlation operation, denoted by $\textcircled{x}$, is a method of comparing two tiles and which calculates the summed products of corresponding pixels in two tiles at multiple shift positions:

$$h = f \otimes g \Leftrightarrow h(x, y) = \sum_{i,j} f(i, j) \cdot g(x + i, y + j)$$

If there exists a position of maximum matching overlap between the two tiles, the value of the correlation will be a maximum at this position.

Correlation can be performed efficiently using the Fourier Transform, where $\mathcal{F}(f)$ is the Fourier transform of f, $\mathcal{F}^{-1}(f)$ is the inverse Fourier transform, and, $\mathcal{F}(g)^*$ is the conjugate of the Fourier transform of g:

$$f \textcircled{x} g = \mathcal{F}^{-1}((\mathcal{F}(f) \cdot \mathcal{F}(g)^*)$$

Variation on correction using the Fourier Transform, such as using phase correlation or selective weighing of frequencies in the product of the Fourier transforms, can be used to achieve a sharp, easily-detectible correlation peak.

A pre-processing step for the reference and target tiles is sometimes used with correlation-based shift-estimation methods. In some correlation operations, the edges of a tile can form a very strong feature, as they can appear very similar to a strong line segment. This may result in a "false" correlation peak being formed at the origin by a match of the edges of one tile with the edges of the other, or anywhere else by a match of the edges of one tile with a line feature in the other. To mitigate this effect, the two tiles can be pre-processed using a combination of padding, band-pass filtering, and a half-Hann window, or similar, on the edge pixels. Such techniques are known in the art.

It is also necessary to choose a tile containing appropriate detail for shift estimation purposes. The tile must contain sufficient high-frequency or mid-frequency information with orientation of at least two substantially different angles. If no high-frequency information is present in the tile, the correlation peak will be broad and subject to distortion by any lighting gradient in the input tiles, and is likely to lead to inaccurate shift estimation. If the frequency content exists substantially in a single direction, then shift estimation will be inaccurate in a direction orthogonal to the tile features. If a tile contains periodic features, such as a grid of lines or a dotted line, then there may be ambiguity in a matching shift, potentially resulting in incorrect shift estimation.

If the two tiles are shifted relative to each other, and have been chosen to have appropriate detail for shift estimation, then a correlation peak will appear at a displacement from the origin directly corresponding to the shift between the two tiles.

The strength of the correlation peak, measured as its height for real-valued correlations, and the corresponding modulus for complex-values correlations, can provide a measure of confidence in the shift. A strong peak generally indicates that the two tiles contain the same or similar data, possibly shifted relative to one another. A weak peak can indicate that the two tiles do not contain related data, or that the data in one of the tiles has been degraded too far.

Applications where the target image contains data similar to an unknown one of a collection of reference images are typically only interested in determining which one reference image is represented in the target image, and the results of a shift estimation for that one image. However, determining which reference image is represented in the target image can be expensive. One approach is to perform correlation-based shift estimation between each reference image and the target image. A sufficiently high correlation peak indicates that a version of the reference image, potentially degraded, was found in the target image. The location of that peak provides the shift estimation.

Other applications have target image containing data, potentially degraded, from all reference images, and require a shift estimation for each reference image. One such application is an output checker, which is a system for ensuring that all pages emitted by a printer are free of defects. An output checker operates by comparing a printed pattern to a collection of ideal, or expected, patterns.

A way to attempt to speed up multiple correlations from a collection of reference images, where the reference images contain some similarity, is to decompose the target image and each reference image into a low-dimensional representation. A two-dimensional image of size n×m can be treated as a point in an n×m dimensional space. If the reference images are sufficiently similar, they can be approximated as a point in a lower-dimensional space. A prior art technique for performing correlations using a low-dimensional representation of images creates a set of eigenimages from the reference images (an eigenimage is an n×m dimensional orthonormal vector), and decomposes both target and reference images into a weighed sum of eigenimages plus the mean image of the reference images. Shift estimation is calculated using a correlation algorithm modified to use the eigenimage decomposition. Decomposing an image into a number of eigenimages requires projecting the original image onto each eigenimage. For some applications, this is a relatively expensive operation.

Shift estimation by correlation is also a relatively expensive operation in some applications. For applications where speed is important, performing multiple correlations to determine which reference image is represented in the target image, or measures shifts from multiple reference images where all reference images are represented in target image, may be prohibitively expensive.

SUMMARY

It is an object of the present invention to substantially overcome or at least ameliorate one of more deficiencies with existing shift estimation methods.

According to one aspect of the present disclosure there is provided a computer implemented method for identifying a component tile within a target image, the method comprising:

receiving a plurality of distinct component tiles;

overlaying the plurality of component tiles to form an overlaid image, said overlaying being based on an embedded parameter value for each component tile;

comparing the target image with the overlaid image to determine a matching parameter value; and identifying a component tile within the target image by determining that the embedded parameter value of the component tile is the closest of the embedded parameter values to the matching parameter value.

According to another aspect there is provided a computer implemented method for detecting a component tile within a target image, the method comprising:

receiving an overlaid image formed from a plurality of distinct component tiles, said overlaid image having an embedded parameter value associated to each component tile;

comparing the target image with the overlaid image to determine a matching parameter value; and identifying a component tile within the target image by determining that the embedded parameter value associated with the component tile is the closest of the plurality of embedded parameter values to the matching parameter value.

In either method, the parameter values preferably comprise phase components.

The methods may further comprise associating a parameter range with the embedded parameter value, and the identifying comprises using the parameter range to determine which embedded parameter value is closest to the matching parameter value.

Desirably the component tiles are located within the target image. Preferably, this approach further comprises associating a range of parameter values with the embedded parameter values using a mapping from real space to complex space. Here the associating is formed by multiplying tile components by a complex number with predetermined phase.

Advantageously the overlaying is performed by averaging the component tiles.

Preferably the overlaying uses a part of the component tiles. Particularly the part of the component tile used for overlaying is determined by shifting. Alternatively the part of component tile used for overlaying is determined according to a pattern.

In another implementation the comparing comprises element-wise multiplying the target image and the overlaid image, and aggregating the multiplied elements to form the matching parameter value.

Alternatively the comparing may comprise correlating the target image with the overlaid image to forma correlation image, and interpolating a peak in the correlation image to form the matching parameter value.

Advantageously the method may further comprise determining a confidence of a matching between the closest embedded parameter value and the matching parameter value using a magnitude value determined by the comparing.

In a specific implementation, the plurality of component tiles are all sourced from the same image.

Other aspects are also disclosed.

BRIEF DESCRIPTION OF THE DRAWINGS

At least one embodiment of the invention will now be described with reference to the following drawings, in which:

FIG. 7 shows an extraction of a target tile region, for use with some tile identification and shift estimation methods;

FIGS. 8 and 9 show an adjustment to target and filtered tile sub-regions, for use with some tile identification and shift estimation methods;

DETAILED DESCRIPTION INCLUDING BEST MODE

Context

Figure 12A:
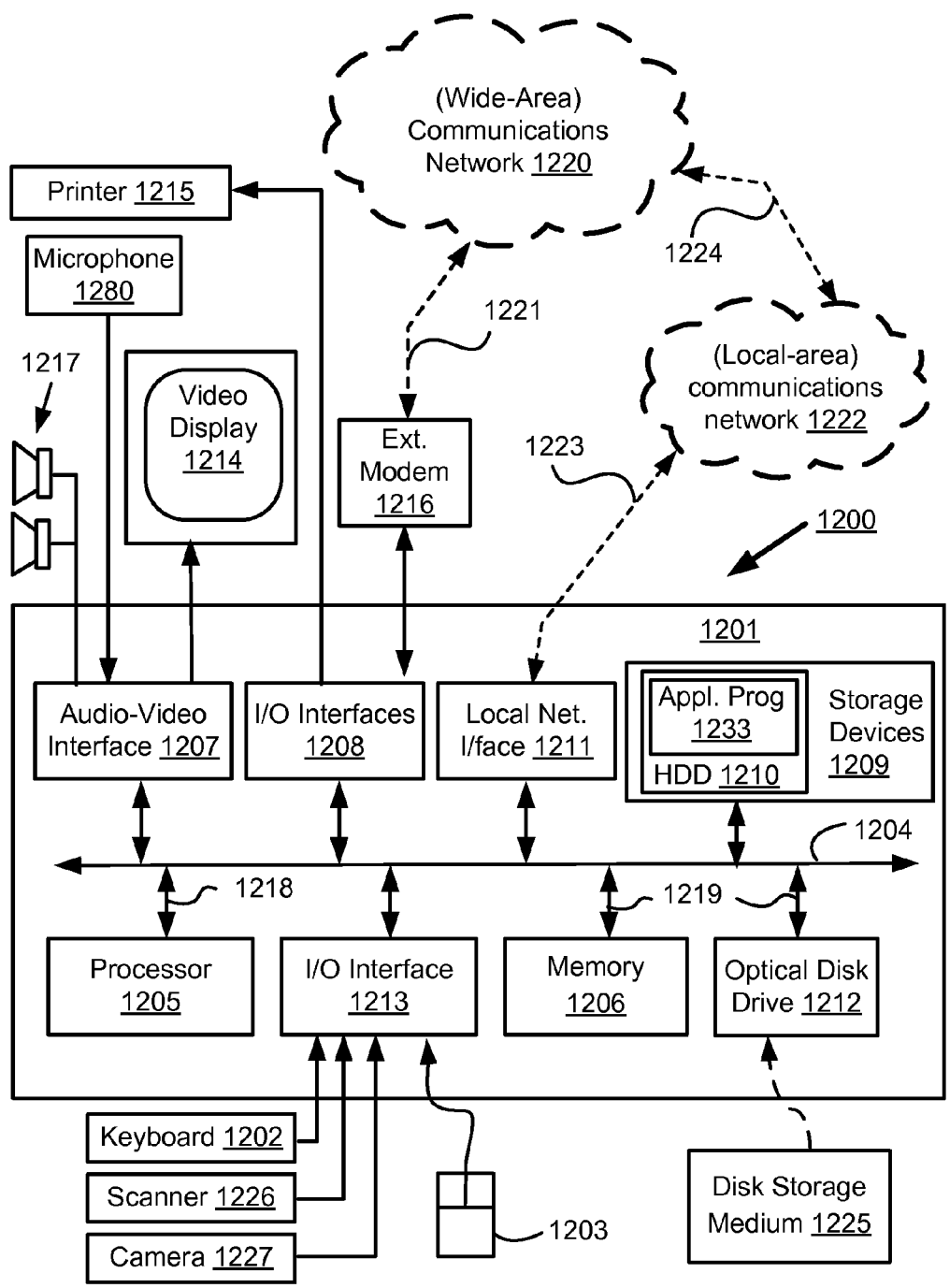
FIGS. 12A and 12B show a schematic block diagram representation of a general purpose computer upon which the arrangements described may be performed.
Figure 12B:
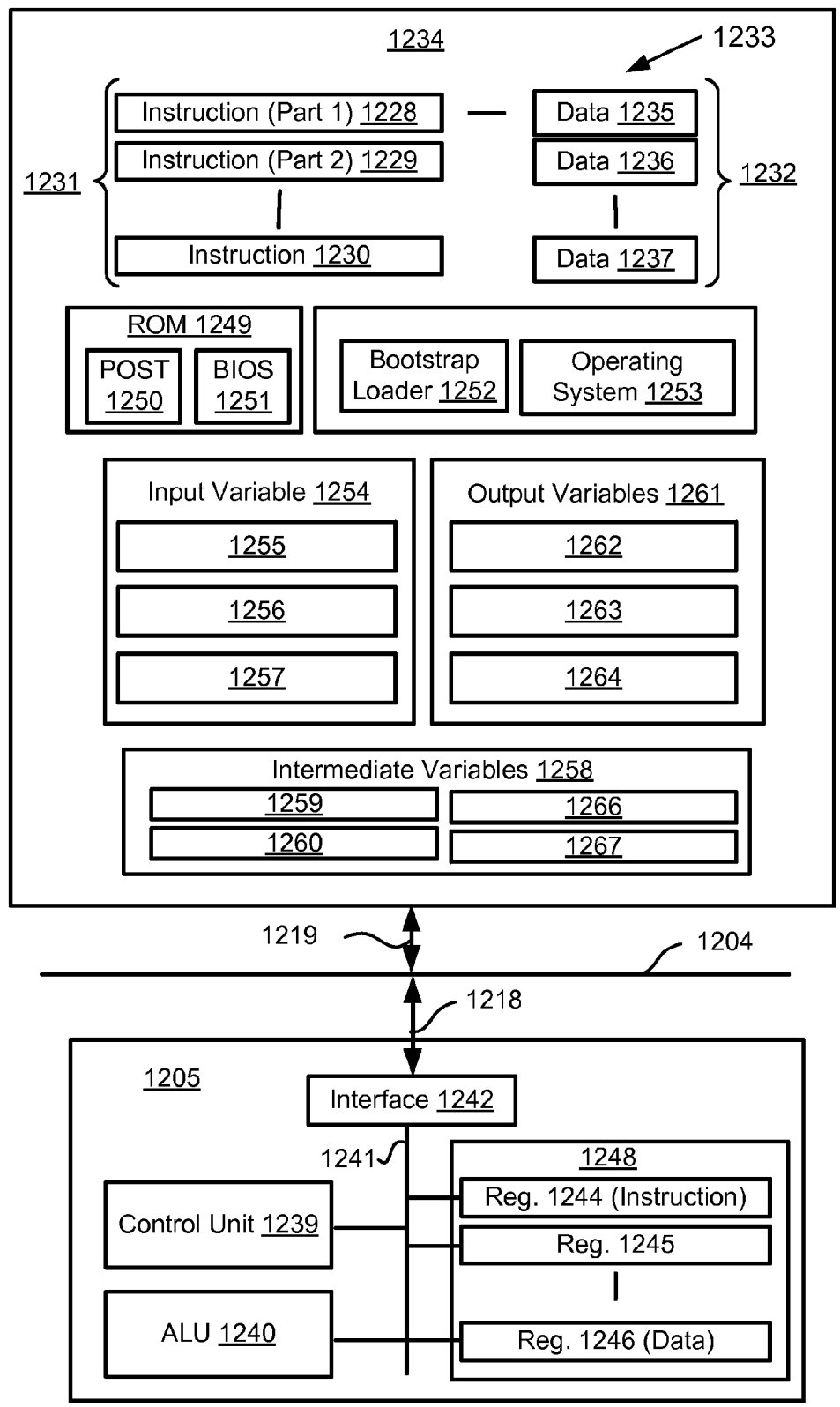

FIGS. 12A and 12B depict a general-purpose computer system 1200, upon which the various arrangements of shift estimation and tile identification to be described can be practiced.

As seen in FIG. 12A, the computer system 1200 includes: a computer module 1201; input devices such as a keyboard 1202, a mouse pointer device 1203, a scanner 1226, a camera 1227, and a microphone 1280; and output devices including a printer 1215, a display device 1214 and loudspeakers 1217. The camera 1227 may be a source of images to be processed in the manner to be described. An external Modulator-Demodulator (Modem) transceiver device 1216 may be used by the computer module 1201 for communicating to and from a communications network 1220 via a connection 1221. The communications network 1220 may be a wide-area network (WAN), such as the Internet, a cellular telecommunications network, or a private WAN. Where the connection 1221 is a telephone line, the modem 1216 may be a traditional "dial-up" modem. Alternatively, where the connection 1221 is a high capacity (e.g., cable) connection, the modem 1216 may be a broadband modem. A wireless modem may also be used for wireless connection to the communications network 1220.

The computer module 1201 typically includes at least one processor unit 1205, and a memory unit 1206. For example, the memory unit 1206 may have semiconductor random access memory (RAM) and semiconductor read only memory (ROM). The computer module 1201 also includes an number of input/output (I/O) interfaces including: an audio-video interface 1207 that couples to the video display 1214, loudspeakers 1217 and microphone 1280; an I/O interface 1213 that couples to the keyboard 1202, mouse 1203, scanner 1226, camera 1227 and optionally a joystick or other human interface device (not illustrated); and an interface 1208 for the external modem 1216 and printer 1215. In some implementations, the modem 1216 may be incorporated within the computer module 1201, for example within the interface 1208. The computer module 1201 also has a local network interface 1211, which permits coupling of the computer system 1200 via a connection 1223 to a local-area communications network 1212, known as a Local Area Network (LAN). As illustrated in FIG. 12A, the local communications network 1212 may also couple to the wide network 1220 via a connection 1224, which would typically include a so-called "firewall" device or device of similar functionality. The local network interface 1211 may comprise an Ethernet™ circuit card, a Bluetooth™ wireless arrangement or an IEEE 802.11 wireless arrangement; however, numerous other types of interfaces may be practiced for the interface 1211. The networks 1220 and 1212 may be sources of images to be processed in the manner to be described.

The I/O interfaces 1208 and 1213 may afford either or both of serial and parallel connectivity, the former typically being implemented according to the Universal Serial Bus (USB) standards and having corresponding USB connectors (not illustrated). Storage devices 1209 are provided and typically include a hard disk drive (HDD) 1210. Other storage devices such as a floppy disk drive and a magnetic tape drive (not illustrated) may also be used. An optical disk drive 1212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1200.

The components 1205 to 1213 of the computer module 1201 typically communicate via an interconnected bus 1204 and in a manner that results in a conventional mode of operation of the computer system 1200 known to those in the relevant art. For example, the processor 1205 is coupled to the system bus 1204 using a connection 1218. Likewise, the memory 1206 and optical disk drive 1212 are coupled to the system bus 1204 by connections 1219. Examples of computers on which the described arrangements can be practised include IBM-PC's and compatibles, Sun Sparcstations, Apple Mac™ or a like computer systems.

The methods of displacement and spatial distortion measurement may be implemented using the computer system 1200 wherein the processes of FIGS. 1 to 11, to be described, may be implemented as one or more software application programs 1233 executable within the computer system 1200. In particular, the steps of the methods of shift estimation and tile identification are effected by instructions 1231 (see FIG. 12B) in the software 1233 that are carried out within the computer system 1200. The software instructions 1231 may be formed as one or more code modules, each for performing one or more particular tasks. The software may also be divided into two separate parts, in which a first part and the corresponding code modules performs the shift estimation and tile identification methods and a second part and the corresponding code modules manage a user interface between the first part and the user.

The software may be stored in a computer readable medium, including the storage devices described below, for example. The software is loaded into the computer system 1200 from the computer readable medium, and then executed by the computer system 1200. A computer readable medium having such software or computer program recorded on the computer readable medium is a computer program product. The use of the computer program product in the computer system 1200 preferably effects an advantageous apparatus for shift estimation and tile identification in images.

The software 1233 is typically stored in the HDD 1210 or the memory 1206. The software is loaded into the computer system 1200 from a computer readable medium, and executed by the computer system 1200. Thus, for example, the software 1233 may be stored on an optically readable disk storage medium (e.g., CD-ROM) 1225 that is read by the optical disk drive 1212. A computer readable medium having such software or computer program recorded on it is a computer program product. The use of the computer program product in the computer system 1200 preferably effects an apparatus for shift estimation and tile identification in images.

In some instances, the application programs 1233 may be supplied to the user encoded on one or more CD-ROMs 1225 and read via the corresponding drive 1212, or alternatively may be read by the user from the networks 1220 or 1212. Still further, the software can also be loaded into the computer system 1200 from other computer readable media. Computer readable storage media refers to any non-transitory tangible storage medium that provides recorded instructions and/or data to the computer system 1200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1201. Examples of transitory or non-tangible computer readable transmission media that may also participate in the provision of software, application programs, instructions and/or data to the computer module 1201 include radio or infra-red transmission channels as well as a network connection to another computer or networked device, and the Internet or Intranets including e-mail transmissions and information recorded on Websites and the like.

The second part of the application programs 1233 and the corresponding code modules mentioned above may be executed to implement one or more graphical user interfaces (GUIs) to be rendered or otherwise represented upon the display 1214. Through manipulation of typically the keyboard 1202 and the mouse 1203, a user of the computer system 1200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1217 and user voice commands input via the microphone 1280.

FIG. 12B is a detailed schematic block diagram of the processor 1205 and a "memory" 1234. The memory 1234 represents a logical aggregation of all the memory modules (including the HDD 1209 and semiconductor memory 1206) that can be accessed by the computer module 1201 in FIG. 12A.

When the computer module 1201 is initially powered up, a power-on self-test (POST) program 1250 executes. The POST program 1250 is typically stored in a ROM 1249 of the semiconductor memory 1206 of FIG. 12A. A hardware device such as the ROM 1249 storing software is sometimes referred to as firmware. The POST program 1250 examines hardware within the computer module 1201 to ensure proper functioning and typically checks the processor 1205, the memory 1234 (1209, 1206), and a basic input-output systems software (BIOS) module 1251, also typically stored in the ROM 1249, for correct operation. Once the POST program 1250 has run successfully, the BIOS 1251 activates the hard disk drive 1210 of FIG. 12A. Activation of the hard disk drive 1210 causes a bootstrap loader program 1252 that is resident on the hard disk drive 1210 to execute via the processor 1205. This loads an operating system 1253 into the RAM memory 1206, upon which the operating system 1253 commences operation. The operating system 1253 is a system level application, executable by the processor 1205, to fulfil various high level functions, including processor management, memory management, device management, storage management, software application interface, and generic user interface.

The operating system 1253 manages the memory 1234 (1209, 1206) to ensure that each process or application running on the computer module 1201 has sufficient memory in which to execute without colliding with memory allocated to another process. Furthermore, the different types of memory available in the system 1200 of FIG. 12A must be used properly so that each process can run effectively. Accordingly, the aggregated memory 1234 is not intended to illustrate how particular segments of memory are allocated (unless otherwise stated), but rather to provide a general view of the memory accessible by the computer system 1200 and how such is used.

As shown in FIG. 12B, the processor 1205 includes a number of functional modules including a control unit 1239, an arithmetic logic unit (ALU) 1240, and a local or internal memory 1248, sometimes called a cache memory. The cache memory 1248 typically includes a number of storage registers 1244-1246 in a register section. One or more internal busses 1241 functionally interconnect these functional modules. The processor 1205 typically also has one or more interfaces 1242 for communicating with external devices via the system bus 1204, using a connection 1218. The memory 1234 is coupled to the bus 1204 using a connection 1219.

The application program 1233 includes a sequence of instructions 1231 that may include conditional branch and loop instructions. The program 1233 may also include data 1232 which is used in execution of the program 1233. The instructions 1231 and the data 1232 are stored in memory locations 1228, 1229, 1230 and 1235, 1236, 1237, respectively. Depending upon the relative size of the instructions 1231 and the memory locations 1228-1230, a particular instruction may be stored in a single memory location as depicted by the instruction shown in the memory location 1230. Alternately, an instruction may be segmented into a number of parts each of which is stored in a separate memory location, as depicted by the instruction segments shown in the memory locations 1228 and 1229.

In general, the processor 1205 is given a set of instructions which are executed therein. The processor 1105 waits for a subsequent input, to which the processor 1205 reacts to by executing another set of instructions. Each input may be provided from one or more of a number of sources, including data generated by one or more of the input devices 1202, 1203, data received from an external source across one of the networks 1220, 1202, data retrieved from one of the storage devices 1206, 1209 or data retrieved from a storage medium 1225 inserted into the corresponding reader 1212, all depicted in FIG. 12A. The execution of a set of the instructions may in some cases result in output of data. Execution may also involve storing data or variables to the memory 1234.

The disclosed shift estimation and tile identification arrangements use input variables 1254, which are stored in the memory 1234 in corresponding memory locations 1255, 1256, 1257. The shift estimation and tile identification arrangements produce output variables 1261, which are stored in the memory 1234 in corresponding memory locations 1262, 1263, 1264. Intermediate variables 1258 may be stored in memory locations 1259, 1260, 1266 and 1267.

Referring to the processor 1205 of FIG. 12B, the registers 1244, 1245, 1246, the arithmetic logic unit (ALU) 1240, and the control unit 1239 work together to perform sequences of micro-operations needed to perform "fetch, decode, and execute" cycles for every instruction in the instruction set making up the program 1233. Each fetch, decode, and execute cycle comprises:

a fetch operation, which fetches or reads an instruction 1231 from a memory location 1228, 1229, 1230;

a decode operation in which the control unit 1239 determines which instruction has been fetched; and an execute operation in which the control unit 1239 and/or the ALU 1240 execute the instruction.

Thereafter, a further fetch, decode, and execute cycle for the next instruction may be executed. Similarly, a store cycle may be performed by which the control unit 1239 stores or writes a value to a memory location 1232.

Each step or sub-process in the processes of FIGS. 1 to 11 is associated with one or more segments of the program 1233 and is performed by the register section 1244, 1245, 1247, the ALU 1240, and the control unit 1239 in the processor 1205 working together to perform the fetch, decode, and execute cycles for every instruction in the instruction set for the noted segments of the program 1233.

The methods of shift estimation and tile identification may alternatively be implemented in dedicated hardware such as one or more integrated circuits performing the functions or sub functions of shift estimation and tile identification. Such dedicated hardware may include graphic processors, digital signal processors, or one or more microprocessors and associated memories.

Overview

Disclosed are computer-implementable and computer-implemented methods for combining a collection of tiles for advantageously performing shift estimation of data against the same or similar to data from any tile in the collection. These shift-estimation methods can be used to locate and identify a tile from the collection of tiles within a larger image. Further disclosed are methods for advantageously identifying a tile in the collection of tiles from a combination of those tiles and data the same or similar to data from any tile in the collection.

When a significant proportion of two image tiles contain the same or similar data, and the tiles contain a broad frequency spectrum, the correlation of those two tiles typically results in a correlation image containing a peak many times higher than most other pixels in the correlation image. The location of this peak provides an estimation of the shift between the two tiles. When two tiles do not contain related data, their correlation typically results in an image without significant peaks.

When two tiles are element-wise summed together, and the resulting combined tile correlated against a third tile, the resulting correlation will be equivalent to the element-wise summation of separate correlations of each of the first two tiles against the third. If a significant part of one of those first two tiles contains the same or similar data to part of the third, and the other doesn't, and the range of pixel intensities and spectral bandwidths in the first two tiles are somewhat similar, then the resulting correlation typically contains a significant peak. This is because the typical resulting correlation is equivalent to the summation of component correlation images, where one has a significant peak and one doesn't, and that peak is many times higher than most pixels in either component. The location of the peak in the resulting correlation will be the same or similar to the location of the peak in the component correlation images. Thus, the location of the peak in the resulting correlation provides a shift estimation for one of the first two tiles relative to the third tile.

A tile formed by combining two or more tiles, for example by element-wise summation of the tiles, will be referred to in this disclosure as an overlaid tile (or an overlayed tile, depending on the correctness of spelling). The tiles combined to form an overlaid tile will be referred to as component tiles. An advantageous way of overlaying tiles to form an overlaid tile is by averaging two or more component tiles. Another advantageous way of forming an overlaid tile is to assign to every pixel in the overlaid tile the value from a corresponding pixel in a component tile, so that at least one pixel value from each component tile is represented in the overlaid tile. Other combinational overlaying techniques may be used to form an overlaid tile, as well as variations on the previously mentioned techniques. Importantly, the combination technique should be one which retains sufficient information from each component tile to be able to estimate shifts against data that is the same or similar to that contained in each component tile. That is, the correlation of the overlaid tile with a target tile containing the same or similar data as any of its component tiles should typically result in a correlation peak representing the shift between the target tile and that component tile.

Shift estimation by correlation is a relatively computationally expensive operation in some applications. One approach for locating one of a collection of known tiles within an image containing unknown data involves a shift estimation calculation for every tile in the collection. Shift estimation using an overlaid tile formed from the collection has a speed advantage over this approach, by requiring only one shift estimation calculation.

Performing shift estimation between a target tile or image and an overlaid tile, without any additional information, provides only a shift, and possibly a measure of confidence in the shift. For some applications this is sufficient. For other applications, it is necessary to also identify which component tile with which the shift is associated.

One approach for identifying the particular component tile with which the shift is associated involves comparing each component tile with data at the shift location in the target tile or image. This can be a computationally expensive process. As identified by the inventors, a speed advantage can be achieved by encoding suitable disambiguating information, either separately to or within an overlaid tile. The disambiguating information is used with a target tile or image to attempt to identify a component tile that is the same or similar to a shifted version (including zero shift) of the target tile. Methods of encoding suitable disambiguating information, along with methods for efficiently identifying component tiles from the disambiguating information, include encoding disambiguating information in the complex phase of a complex-valued overlaid tile. Complex correlation of the overlaid tile with a target tile, or element-wise multiplication and summation of the overlaid tile with a target tile containing appropriate data, results in a complex phase value that can be mapped back to a component tile, thus identifying the tile. This and related methods will be described in detail later in this disclosure.

Note that the identification methods described herein are not infallible. As with shift estimation techniques, the identification methods provide an estimate only.

Example 1

A preferred method of encoding disambiguating information is to create an overlaid tile using complex values, where the disambiguating information is encoded in the complex phases of the pixels. This may be achieved by multiplying each component tile by a different complex number of unit magnitude, either before or during the process of combining the component tiles to form an overlaid tile. Preferably, the complex numbers will have phases evenly distributed between $-\pi$ and $+\pi$ radians. Alternatively, the phase distribution may be based on the content of each component tile, with tiles containing high detail suitable for correlation having phase spaced closer than tiles containing low detail.

Figure 1:
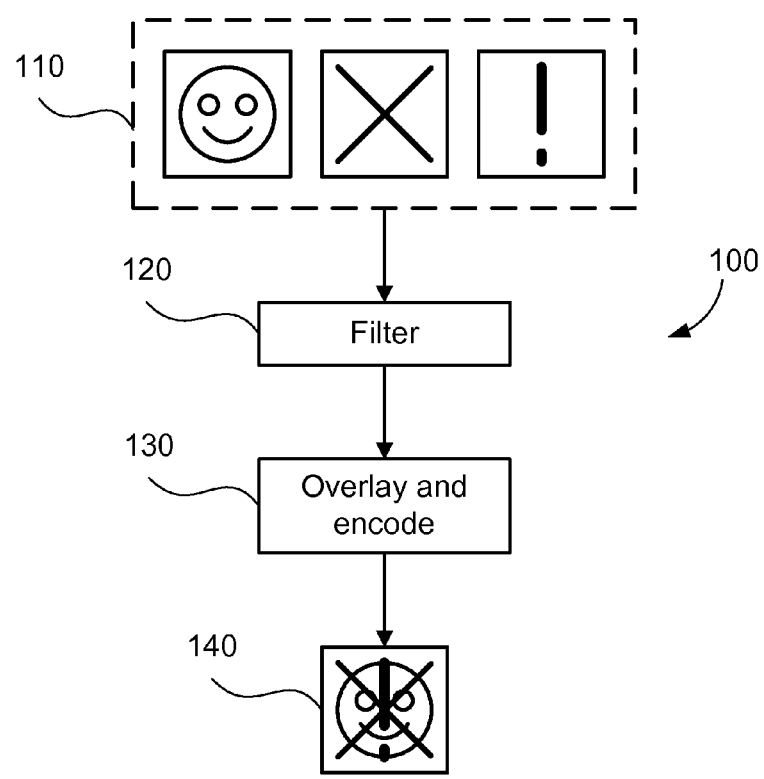
FIG. 1 shows a schematic flow diagram illustrating a method of creating an overlaid tile with disambiguating information.

FIG. 1 shows a process 100 for forming an overlaid tile 140 from a collection of tiles 110. Process 100 also encodes disambiguating information for the formed overlaid tile. Process 100 is preferably implemented as software executable on the computer 1201.

An input to process 100 is a collection of real-valued component tiles 110. The tiles of collection 110 are optionally processed at filtering step 120, to improve their effectiveness for shift estimation. This may include filtering to remove some frequencies, and to enhance others. The filtering 120 may include applying a half-Hann window, or similar, to pixels near the edge of the tile, and padding the tile with zero values, if the overlaid tile 140 produced by process 100 is intended for use with Fourier-based correlation techniques. The filtering 120 may also include applying a blur corresponding to a spatial transform, such as rotation or scaling, to provide robustness for shift estimation in the presence of such transforms. The filtering 120 may also include adjusting mean value and the pixel range of each tile in collection 110 to be substantially the same.

Step 130 performs the overlaying to form the overlaid tile 140 by combining the collection of tiles processed by step 120. Step 130 further encodes disambiguating information for the overlaid tile. Preferably, the overlaid tile 140 is formed by averaging the collection of tiles processed by step 120 after multiplying each tile by a different complex value of unit magnitude, representing the disambiguating information, resulting in a complex valued tile. Suitable complex values will be discussed later, with reference to FIG. 2B. The complex pixel values in the overlaid tile 140, if formed by the above described technique of multiplying by complex values of unit magnitude, encodes both tile data from the input collection 110 and disambiguating information. The multiplication forms a mapping from real space to complex space that associates the range of parameter values for a tile by embedding the parameter into the tile.

Figure 11A:
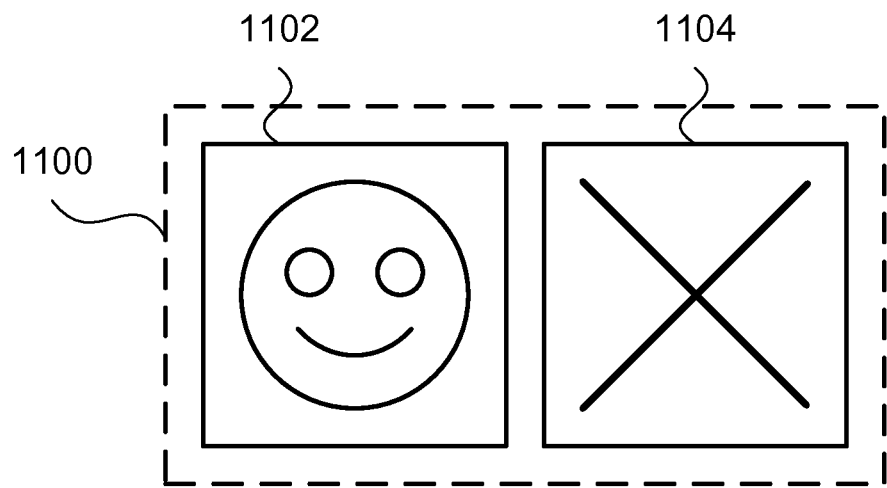
FIGS. 11A and 11B show an example overlaid tile where pixels are assigned according to a specified pattern.
Figure 11B:
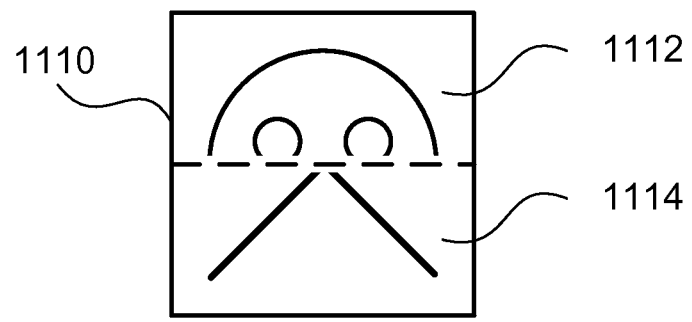

An alternative way of forming overlaid tile 140 is by assigning pixel values from each tile in the collection of tiles processed by step 120 to the overlaid tile 140 according to a specified pattern. An example pattern for two component tiles, illustrated in FIGS. 11A and 11B, is to assign, for each component tile, half of the pixels from the component tile to a spatially distinct half of the overlaid tile 140. A different example pattern for two component tiles is to assign pixels from each component tile to the overlaid tile 140 according to a chequerboard pattern. Many other patterns for two or more component tiles can also be used. Patterns may also be chosen based on the content of the component tile, in order to maximise the amount of detail suitable for correlation kept from each component tile.

In this alternative case, disambiguating information can be encoded in the same way as the preferred case described above, by first multiplying each component tile by a different complex value of unit magnitude representing the disambiguating information. An alternative way of encoding disambiguating information is where the disambiguating information resides in or otherwise contributes to the formation of the pattern used to assign pixels to the overlaid image 140. Using such disambiguating information will be described later, with reference to a variant of process 600.

Process 100 may also be used to form an overlaid tile without disambiguating information, for use in shift estimation. Such a tile is preferably formed by averaging the collection of real-valued tiles processed by step 120, resulting in a real-valued overlaid tile 140. This real-valued tile can be used in shift estimation operations, such as real-valued correlation, for example to advantageously produce a shift estimation for input 630 of process 600, shown in FIG. 6. Correlation between two real-valued patches can be implemented using approximately half the number of operations as correlation with complex-valued patches, and can therefore be calculated in approximately half the time.

Figure 2A:
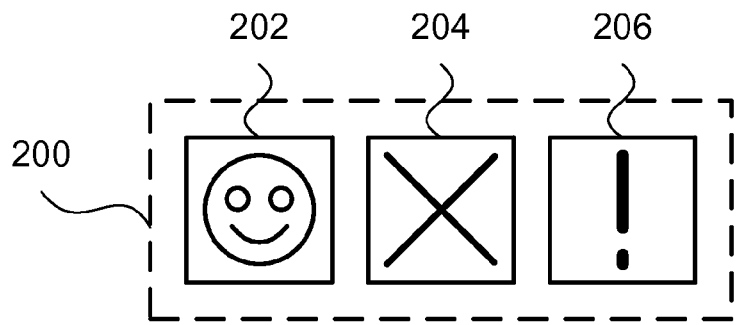
FIGS. 2A to 2C show schematic relationship diagrams for mapping complex phases to component tiles of an overlaid image.
Figure 2B:
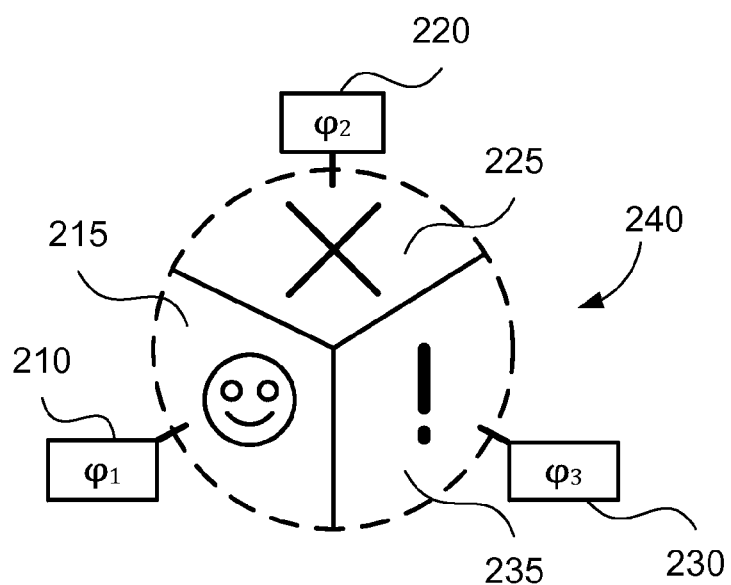
Figure 2C:
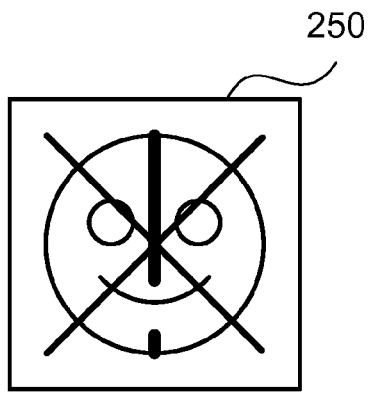

FIGS. 2A to 2C show an example application of process 100 to a collection of input tiles.

FIG. 2A shows the collection 200 of component tiles, comprising tiles 202, 204 and 206. This collection 200 can be used as the input collection 110 to process 100. The images in the collection 200 are individually distinctive images. In the example of FIG. 2A, the images are markedly distinctive, being a smiley face, a cross, and an exclamation mark, representing dissimilar subject matter. Nevertheless, the images may be of similar subject matter, but should have independent content. For example in ophthalmic alignment, images of the eye captured as frames result in distinctive frames, even though the subject matter (the eye) is common. The distinctiveness arises through movement of the eye or parts thereof resulting in the capture of distinct image content in each frame. Movement includes whole-eye movement, such as drift and saccades, and movement within the eye, such as blood cells moving through vessels. Likewise, different regions within the one frame are distinctive, even though the subject matter (the eye) is common. The distinctiveness arises through the varying features across the surface of the eye, such as the pattern of blood vessels. Distinctiveness can also arise from frames captured at different focal planes. The eye has structure that changes with depth. Frames captured at different focal planes contain features present at different depths within the subject matter (the eye).

Relationship diagram 240 of FIG. 2B shows example complex phase components imposed or otherwise assigned to each tile of the collection 200 to thereby afford disambiguating information to each tile. A first phase $\phi_1$ 210 is associated with tile 202, a second phase $\phi_2$ 220 is associated with tile 204 and a third phase $\phi_3$ 230 is associated with tile 206. Example phase values may be $$-\frac{2\pi}{3}$$

radians for $\phi_1$ 210, 0 radians for $\phi_2$ 220, and $$+\frac{2\pi}{3}$$

radians for $\phi_3$ 230. A phase range is also associated with each tile from collection 200. Preferably, the phase range associated with a tile from a collection includes all phase values closer, by angular distance, to the phase associated with that tile than to the phase associated with any other tile in the collection. Alternatively, the phase range associated with a tile includes all phase values less than a specified or calculated distance from the phase associated with that tile. Alternatively, the phase range may be based on the content of each component tile, with tiles containing high detail suitable for correlation having smaller phase ranges than tiles containing low detail.

In the relationship diagram 240, a phase range 215 is associated with tile 202, a phase range 225 is associated with tile 204, and a phase range 235 is associated with tile 206.

These ranges are used to map phase values back to the respective component tiles, and will be discussed later in this disclosure.

FIG. 2C shows a complex-valued overlaid tile 250, formed from the collection of component tiles 200 and associated phases 210, 220 and 230. This overlaid tile 250 may be produced by process 100. Overlaid tile 250 is formed by averaging the collection of component tiles 200 after multiplying them by complex value ($e^{i\Phi}$) of unit magnitude of their associated phase. Specifically, tile 202 is multiplied by a unit value magnitude with phase 210, tile 204 is multiplied by a unit value magnitude with phase 220, and tile 206 is multiplied by a unit value magnitude with phase 230.

Figure 13A:
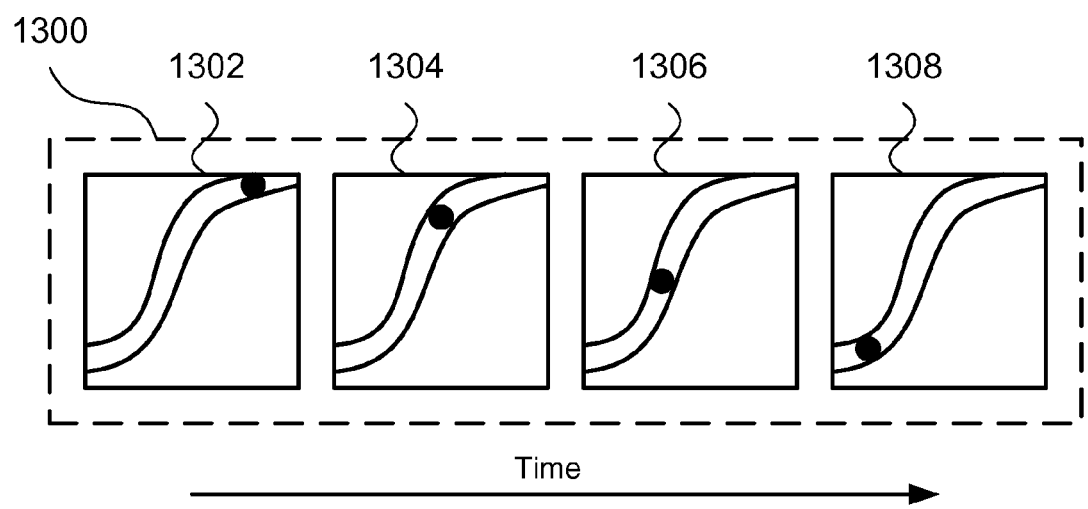
FIGS. 13A and 13B show an example overlaid tile where the component tiles represent data that has changed over time.
Figure 13B:
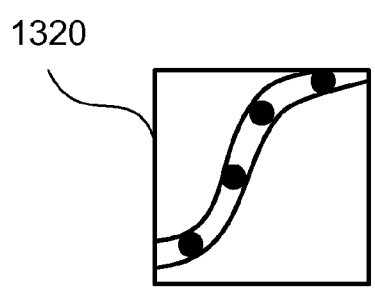

FIGS. 13A and 13B show an example application of process 100, where the component tiles represent data that has changed over time.

FIG. 13A shows a collection 1300 of distinct component tiles, comprising tiles 1302, 1304, 1306 and 1308. This collection 1300 can be used as the input collection 110 to process 100. The component tiles are captured, using a scanning laser ophthalmoscope, from a region of the eye containing a blood vessel. Each component tile is captured at a different point in time. Movement of blood cells though the vessel means that the data representing the blood cells in each component tile is at different positions.

FIG. 13B shows an overlaid tile 1320, formed from the collection 1300 of component tiles. When matching the overlaid tile 1320 to a target tile representing blood cells at an unknown position along a blood vessel, the disambiguating information encoded in overlaid tile 1320 can be used estimate said unknown position.

Figure 14A:
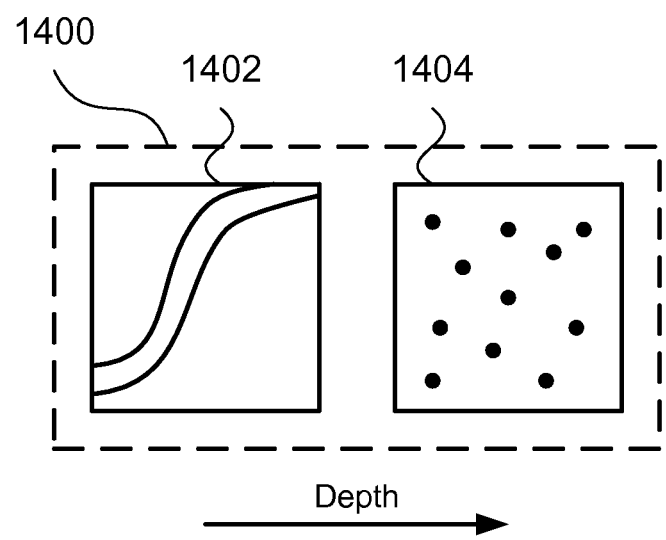
FIGS. 14A and 14B show an example overlaid tile where the component tiles represent data captured at different focal planes.
Figure 14B:
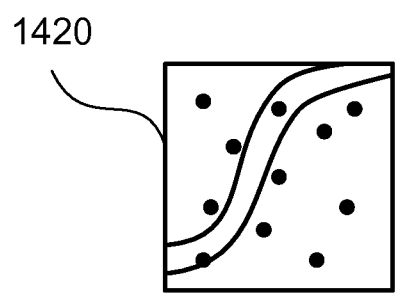

FIGS. 14A and 14B show an example application of process 100, where the component tiles represent data captured at different focal planes.

FIG. 14A shows a collection 1400 of distinct component tiles, comprising tiles 1402 and 1404. This collection 1400 can be used as the input collection 110 to the process 100. The component tiles in this example are captured using a scanning laser ophthalmoscope. Each component tile is captured at a different focal plane, capturing features at different depths within the eye. In this example, tile 1402 captures a blood vessel and tile 1404 captures cone cells.

FIG. 14B shows an overlaid tile 1420, formed from the collection 1400 of component tiles. When matching overlaid tile 1420 to a target tile representing features at an unknown depth within the eye, the disambiguating information encoded in overlaid tile 1420 can be used estimate said unknown depth.

FIGS. 11A and 11B show another example application of process 100 to a collection of input tiles.

FIG. 11A shows a collection 1100 of distinct component tiles, comprising tiles 1102 and 1104. This collection 1100 can be used as the input collection 110 to process 100.

FIG. 11B shows an overlaid tile 1110, formed from the collection 1100 of component tiles, where pixels from each component tile are assigned to overlaid tile 1110 according to a specified pattern. Again, and by virtue of the pattern, the overlaying uses only a part of the component tiles. In this example, the pattern assigns pixels from the top half of component tile 1102 to the top half of overlaid tile 1110, indicated by region 1112, and assigns pixels from the bottom half of component tile 1104 to the bottom half of overlaid tile 1110, indicated by region 1114. This overlaid tile 1110 may be produced by process 100. Disambiguating information may be encoded either by multiplying each component tile in 1100 by a different complex value of unit magnitude before assigning pixels to overlaid tile 1110, resulting in a complex valued overlaid tile 1110. Disambiguating information may be alternatively encoded by maintaining a mapping from region 1112 to component tile 1102 and from region 1114 to component tile 1104.

Other patterns may be used. For example, the pattern could be a cross-hatching whereby alternate regions delineated by the cross-hatching are ascribed to component tiles.

Example 2

Figure 3:
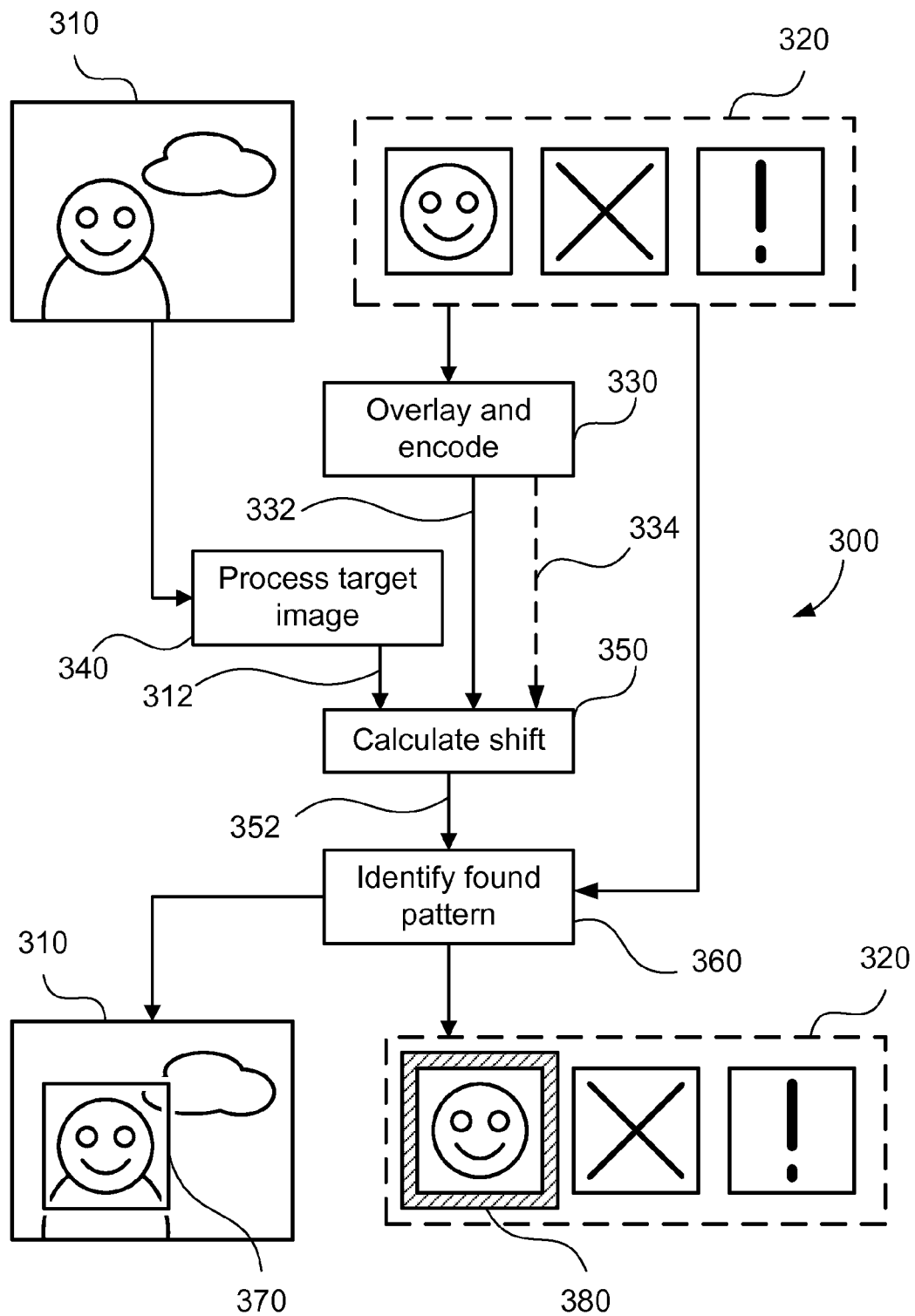
FIG. 3 shows a schematic flow diagram illustrating a method for locating and identifying a pattern in an image from a collection of patterns.

FIG. 3 shows a process 300 for locating and identifying one of a collection of known but distinctive tiles 320 within an image 310 containing unknown data. Process 300 is preferably implemented as software executable on the computer 1201. The image 310 may be stored in the HDD 1210 or memory 1206 of the computer 1201, or form the networks 1220 or 1222 whereupon the computational processing may be considered to be performed in a so-called 'cloud-computing' environment.

Image 310 and tile collection 320 are inputs to process 300. Typically, the tile collection 320 represents a set of features, at least one of which is expected to be found in image 310. Collection 320 may represent watermarks to be searched for within the image 310. Alternatively, the collection 320 may represent components of a synthetic pattern that has been reproduced on some device, such as a printer 1215, then acquired as an image 310. Alternatively, the collection 320 may represent a sequence of frames captured from a region of an eye by a scanning laser ophthalmoscope, where frames in the sequence differ by movement (for example, blood flow through a vessel) or by focus depth (capturing different layers in the structure of the eye).

At step 330, the input tile collection 320 is received by the method 300 and processed to form an overlaid tile 332 encoded with disambiguating information. The overlaying of step 330 may be carried out by process 100. The disambiguating information may be regarded as an example of a parameter value of the input tiles of the collection 320 embedded or otherwise encoded into the overlaid tile 332. Optionally, a (second) real-valued overlaid tile 334, without encoded disambiguating information, may also be produced at step 330. Such a tile 334 can be used in the shift estimation step 350.

The input image 310 is processed at step 340 to a form 312 suitable for use in shift estimation techniques. The processing of step 340 may include extracting a tile from image 310, and optionally filtering and padding this tile.

At step 350, a shift estimation is calculated between the overlaid tile 332 produced by step 330 and the output 312 of image processing step 340. The shift estimation step 350 is preferably calculated by correlation implemented using the Fast Fourier Transform. Alternatively, the shift estimation can be carried out by gradient-based shift estimation, or other such techniques as known in the art. If a real-valued tile was produced at step 330, that real-valued tile may be used with a real-valued shift estimation operation at step 350. Where step 330 generates a real-valued overlaid tile 334, correlation results in a real-valued correlation image that can be used for shift estimation, but which cannot directly be used for disambiguation.

An estimated shift result 352 of the shift estimation calculated at step 350 is used by step 360 to attempt to identify a tile of the input collection 320 that contains data similar to the image 312 that produced by image processing step 340. An output of identification step 360 may be an identified tile, as indicated by selection 380 made in the collection 320. The output may alternatively be that no tile was identified. Processes for performing identification step 360 will be described later, with reference to FIG. 4 and FIG. 6.

An optional output of the process 300 is a region 370, within the input image 310, representing the data found in the image 310 by the shift estimation step 350. The region 370 is centred on a point calculated by the shift estimation between an overlaid tile produced by step 330 and the output of step 340.

Figure 4:
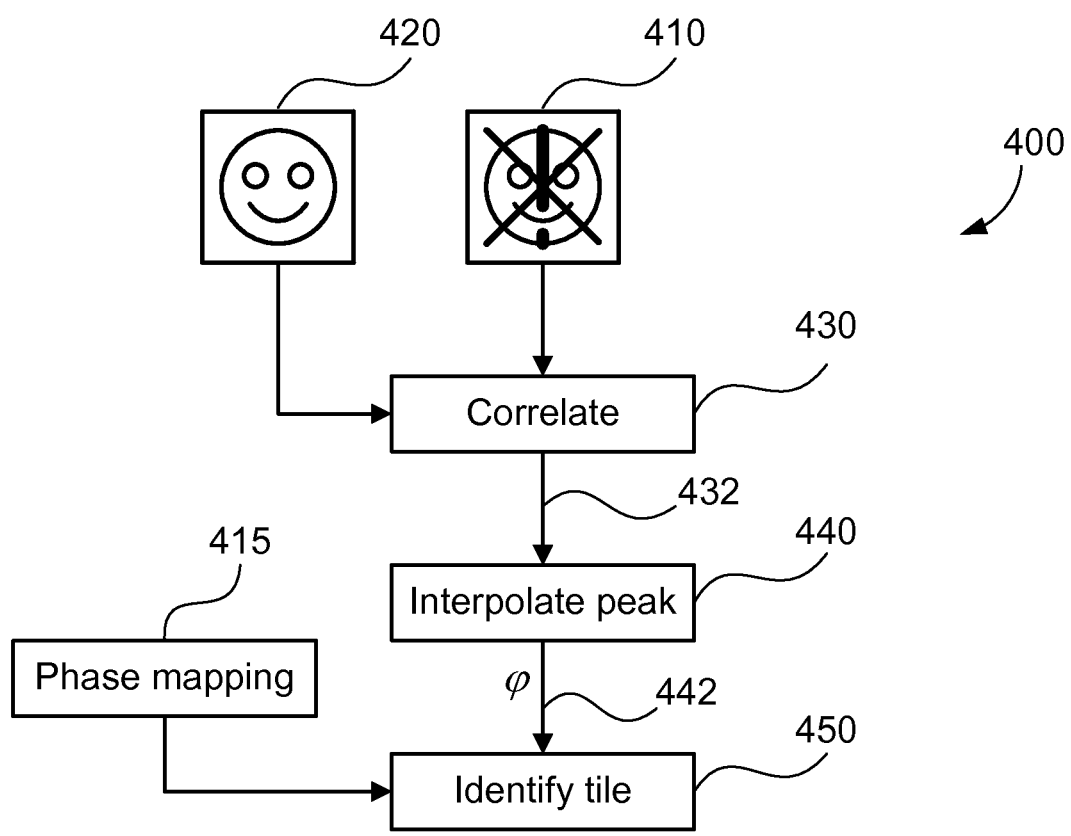
FIG. 4 shows a schematic flow diagram illustrating a method for both estimating a shift and identifying a tile from a collection of tiles.

FIG. 4 shows a method 400 of how a complex-valued overlaid tile can be used in shift estimation of a tile, or for locating data within an image, and identification of a component tile. The method 400 is preferably implemented as software executable on the computer 1201 and is an example of step 360 of FIG. 3.

In FIG. 4, a complex-valued overlaid tile 410, and a target tile 420 are used as inputs to the method 400. The overlaid tile 410 is preferably produced by process 100. Both tiles 410 and 420 have been pre-filtered and padded as appropriate for input to a correlation process used at step 430. A mapping 415 from phase values to the component tiles used to form the overlaid tile 420 is another input to the method 400. Preferably, the mapping 415 maps phase values to the component tiles of the overlaid tile 410 with an associated phase closest to the phase value of the overlaid tile 410. An example mapping is that illustrated in FIG. 2B and described above.

The two tiles 410 and 420 are compared by correlation at step 430, using a correlation technique such as cross correlation or phase correlation, and using the Fast Fourier Transform if appropriate for efficiency. The output of step 430 is a complex-valued correlation image 432. The interpolated sub-pixel position in the correlation image containing the maximum magnitude peak represents the position of the maximum matching overlap between the correlated tiles, and the complex phase of the value of the correlation in this position may be considered as an example of a matching parameter value.

Step 440 then uses the correlation image 432 from step 430 to calculate and identify a peak to a sub-pixel position in the correlation image 432. A preferred calculation includes upsampling some or all of the correlation image 432, identifying a maximum modulus value in the upsampled image, examining a neighbourhood of the maximum value, and interpolating to estimate a peak position $\tilde{x}$ and the complex phase $\phi$ 442 at that peak position $\tilde{x}$. The measured peak position $\tilde{x}$, possibly after origin adjustments, provides the shift estimation. The complex phase $\phi$ 442 at the peak position $\tilde{x}$ may be considered a matching parameter value of the target image. Where the complex phase 442 falls within a corresponding parameter range, being a phase range, a match is deemed to have occurred.

Step 450 identifies a component of overlaid tile 410, using the phase $\phi$ 442 of the peak calculated in step 440 and the phase mapping 415, by mapping the phase $\phi$ to a particular component tile of the overlaid tile 410. Step 450 operates to identify the component tile within the target image by determining that the embedded parameter value of the component tile is the closest of the embedded parameter values, associated with the overlaid tile, to the matching parameter value. It is to be noted that identification of the component tile within the target image may mean that the component tile is the target image, or the component tile is part of the target image. Also, since the interpolation identifies a peak at the peak position $\tilde{x}$, thus in addition to the phase $\phi$, there is an associated magnitude value at the interpolated peak. In a specific implementation, that magnitude value may be used in the identification step 450 to determine a confidence of matching between the tiles.

Example 3

Where the alignment between an overlaid tile and a target tile is already known, another advantageous method of identifying a component tile is to sum the element-wise multiplication of a complex-valued overlaid tile with an appropriate target tile, or to sum the element-wise multiplication of a sub-region of a complex overlaid tile with a sub-region of an appropriate target tile ('multiply-and-sum technique'). The phase of the resulting complex value is then mapped to a component tile of the overlaid tile, in the same manner as with the complex correlation method described above.

An appropriate target tile for multiplication and summation is one that contains the same or similar data to at least one of the component tiles of the overlaid tile. A target tile where only some of the data corresponds to data in at least one of the component tiles of the overlaid tile can also be used. Such a target tile is used by restricting the multiplication and summation to the sub-regions of the target tile and the overlaid tile containing, or sourced from, the same or similar data. Note that the sub-regions may be at different offsets within the target and overlaid tile. Corresponding elements for element-wise operations are those with the same relative offset within each sub-region (but not necessarily the same offset within the whole tile). Similarly, a component tile can be identified by summing the element-wise multiplication of a target tile where only some of the data corresponds to data in at least one of the component tiles of the overlaid tile, when the corresponding data is located at the same or similar offsets within both the target and the overlaid tile. Obtaining appropriate overlaid tile and target data will be described in more detail later, with reference to FIGS. 6, 7 and 8.

An advantage of using this technique over complex correlation for tile identification is speed. Calculating the sum of an element-wise multiplication of two tiles is many times faster than calculating the correlation of the same sized tiles, using either real or complex correlation.

For applications where the alignment between an overlaid tile and a target tile is not otherwise known, a shift estimation technique can be used to find appropriate tiles for applying the multiply-and-sum technique for component tile identification. Shift-estimation techniques described elsewhere in this disclosure can be used here.

One useful approach is to estimate the shift by real-valued correlation with a real-valued version of an overlaid tile. Correlation between two real-valued tiles can be implemented using approximately half the number of operations as correlation with complex-valued tiles, and can therefore be calculated in approximately half the time. As the time to calculate the sum of the element-wise multiplication of two tiles is typically a small fraction of the time of a correlation, a real-valued correlation (for shift estimation), followed by a complex-valued element-wise multiplication and summation (for tile identification), can be calculated in close to half the time as a complex correlation.

An advantage of this approach is where the component tiles used to form an overlaid tile share common data. For example, the collection of component tiles 1300 from FIG. 13A share common data in regions outside the blood vessel. Disambiguating information cannot be usefully encoded in these regions. However, these regions can contain useful information for shift estimation. Common-data regions can be kept in the real-valued version of an overlaid tile, to improve shift estimation, and can be ignored (for example, by setting them to zero) in the complex-valued version of the overlaid tile, to improve component-tile identification.

A disadvantage of this approach is that real-valued shift estimation may, depending on the data in the overlaid tile and target tile, be less accurate than complex-valued estimation. Also, if the shift contains a sub-pixel component, the multiply-and-sum matching parameter estimation may, likewise depending on tile data, be less accurate than that calculated by complex correlation. A way of mitigating the latter inaccuracy is by pre-computing sub-pixel-shifted versions of a complex overlaid tile, and choosing the closest sub-pixel shifted overlaid tile for component tile identification. This technique will be elaborated on later, with reference to FIG. 5.

While the description herein of the multiply-and-sum technique for tile identification uses a complex-valued tile, where the complex phase encodes disambiguating information, other similar or equivalent encodings could be used, such as encoding the disambiguating information in a tile of 2-dimensional vector elements, or across two separate real-valued tiles. Likewise, while summation is preferably used to aggregate the multiplied elements, other aggregation methods may be used to yield useful results.

FIGS. 5 to 8 show alternative methods using overlaid tiles for shift estimation and for identifying component tiles.

Figure 5:
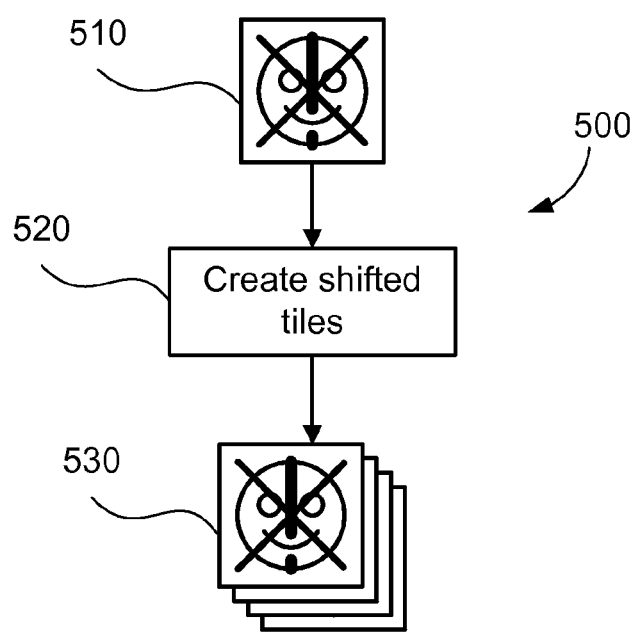
FIG. 5 shows a schematic flow diagram illustrating a method for creating sub-pixel shifted overlaid tiles.
Figure 6:
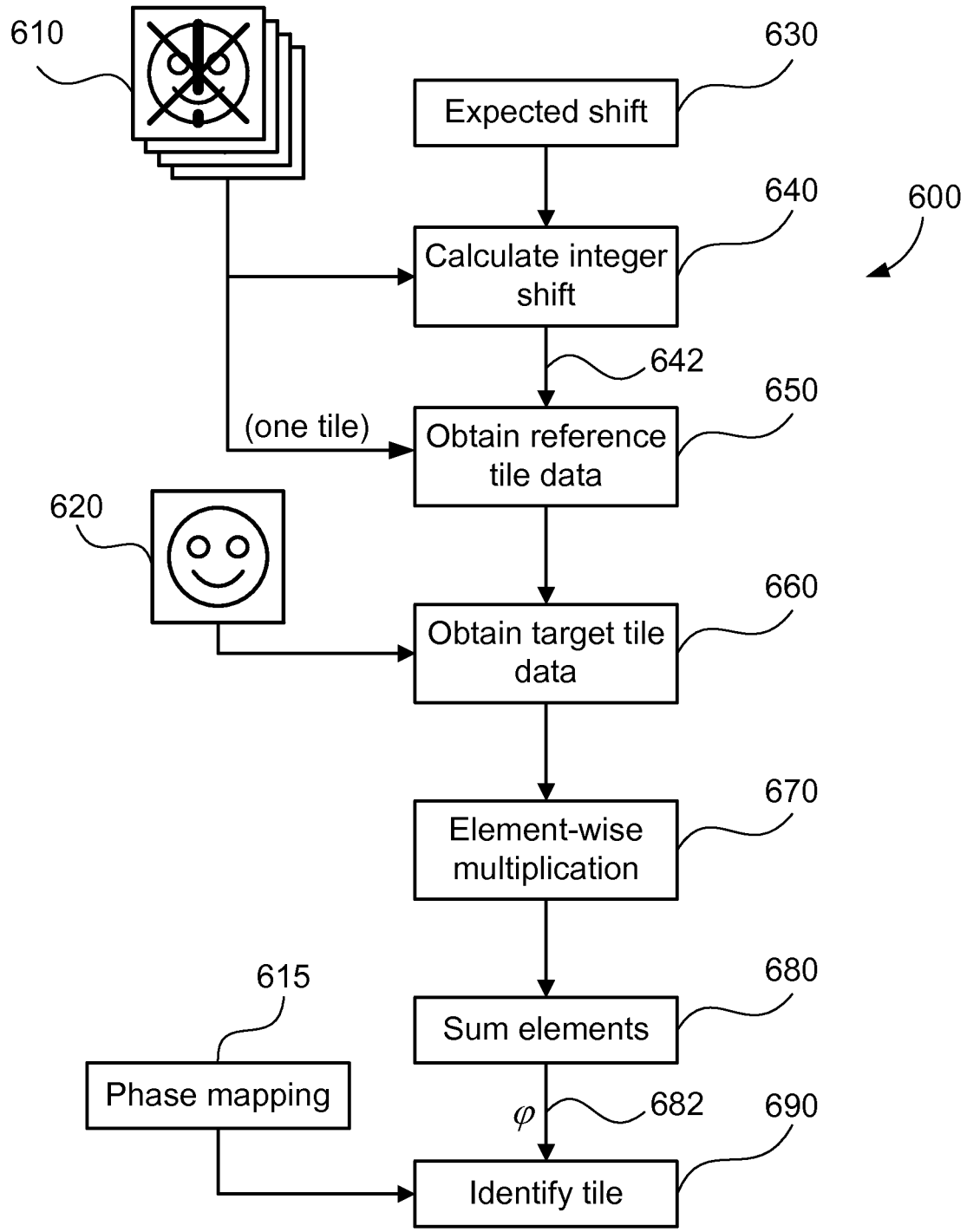
FIG. 6 shows a schematic flow diagram illustrating a method for identifying a tile from a collection of tiles, given a shift estimation.

FIG. 5 shows a process 500 for producing a collection 530 of overlaid tiles, suitable for use with parameter estimation methods such as method 600 from FIG. 6. The process 500 is preferably implemented as software executable on the computer 1201.

In process 500, shown in FIG. 5, a complex overlaid tile 510 is used as an input. Overlaid tile 510 is preferably produced by process 100. Step 520 receives the overlaid tile 510, and creates a number of copies of that tile, where each copy has undergone a sub-pixel (fractional) shift in one or both dimensions. For example, to cover sub-pixel shifts from the set {0.0, +0.25, −0.25, −0.5} in each dimension and in all combinations, step 520 will result in 16 tiles forming the collection 530. Generally, the smaller the sub-pixel step size used (and hence the larger the number of tiles produced), the more accurately methods such as 600 from FIG. 6 can identify a component tile when supplied with tiles produced by the shifting step 520. High-quality sub-pixel-shifted copies of the overlaid tile can alternatively be produced by use of the Fourier Transform in combination with an applied linear phase, or by using a high-quality sinc filter in the spatial domain. The tiles produced by step 520 may be optionally cropped, which allows the input of a larger overlaid tile 510 to the method 500, to provide more data for producing good shifted tiles.

The output of method 500 is the collection of complex overlaid tiles 530. Each tile in the set is substantially the same overlaid tile, but with each shifted by a different sub-pixel amount (including zero). Each tile is also associated, for example by metadata storage, with the amount of shift that produced the tile.

FIG. 6 shows a method 600 of using an overlaid tile and target tile, or target image, to identify a component tile of the overlaid tile. The method 600 is preferably implemented as software executable on the computer 1201 and also represents an example implementation of the identification step 360 of the method of FIG. 3.

An input into method 600 is a one or more complex overlaid tiles 610, each associated with a sub-pixel shift. The one or more overlaid tiles 610 is preferably produced by process 500. Alternatively, the one or more complex overlaid tiles 610 can be produced directly by process 100, in which the input 610 is a single overlaid tile that is implicitly associated with a zero sub-pixel shift.

Another input into method 600 is preferably a target tile 620. If method 600 is used to estimate shifts between images, the target input 620 could instead be a region within a target image.

Another input into method 600 is an expected shift 630 obtained from one of the input overlaid tiles 610 (typically, the overlaid tile associated with zero sub-pixel shift) to the target tile 620, or similarly, a region within a target image. In some applications, the expected shift 630 may be a known value, such as zero. In other applications, the expected shift 630 may have been estimated by correlation with a real-valued overlaid tile.

Another input is a phase mapping 615, being a mapping from phase values to the component tiles used to form the one or more overlaid tiles 610

In step 640, an integer version 642 of the expected shift 630 is calculated. This is preferably calculated using both the expected shift 630 and information on the sub-pixel shifts associated with the overlaid tiles 610. If the sub-pixel shifts are evenly spaced, this information may include the step size (distance) between adjacent sub-pixel shifts, or the number of sub-pixel shifts in each dimension.

Preferably, an integer shift 642 is calculated so that the difference between the integer shift 642 and the expected shift 630 is as close as possible to one of the sub-pixel shifts associated with overlaid tiles 610. For evenly spaced sub-pixel shifts, this can be calculated by multiplying the shift in each dimension by the number of sub-pixel shifts in the same dimension, rounding the result to the nearest integer, dividing the rounded result by the same number of sub-pixel shifts, then rounding the divided result to the nearest integer. For example, if the overlaid tiles are associated with sub-pixel shifts from the set {0.0, +0.25, −0.25, −0.5} in each dimension and in all combinations (four evenly-spaced shifts in each dimension), and the expected shift is (+7.4, −2.2), the preferred integer shift is (+8, −2), the difference between the integer shift and the expected shift is (−0.6, +0.2), and the closest associated sub-pixel shift is (−0.5, +0.25). If only one overlaid tile 610 is supplied (implicitly associated with zero sub-pixel shift), the integer value is preferably calculated by rounding.

In step 650, an appropriate tile, and optionally a sub-region of that tile, is selected from the overlaid tiles 610 to therefore obtain reference tile data. An overlaid tile with an associated sub-pixel shift closest to the difference between the integer shift 642 calculated at step 640 and the excepted shift 630 is first selected. For applications where a target tile 620 is used, a sub-region of that tile may also be calculated. An appropriate sub-region can be calculated by intersecting the selected overlaid tile with a rectangle of the same size as the target tile 620, where the rectangle has been offset by the negation of the integer shift calculated at step 640. An example sub-region calculation is shown in FIG. 9, using an overlaid tile 805. The reference tile data may for example be a cropped representation of the overlaid tile aligned with the cropped target tile at the position where the best match with one of the component tiles has been achieved. The reference tile data may be one tile out of a collection of sub-pixel shifted (overlaid) tiles, or a sub-region of that one tile.

In step 660, an appropriate tile, or sub-region of a tile, is obtained from the target tile 620, or from a target image of which the target tile 620 forms a part. Where the tile is obtained from a target image, it may be possible to extract a tile of the same size as the overlayed tile. The appropriate tile is either a target tile subregion calculated jointly with the reference tile subregion, or it is a tile extracted (and optionally filtered) from an image.

For applications where a target tile 620 is used, step 660 may involve calculating a sub-region of that tile. An appropriate sub-region can be calculated by intersecting the target tile 620 with a rectangle of the same size as the target tile 620, where the rectangle has been offset by the integer shift calculated at step 640. An example sub-region calculation is shown in FIG. 8, using a target tile 800.

For applications where a region within a target image is used, step 660 may involve extracting a new tile from the image, or calculating a new region within the image. An appropriate tile or region can be obtained from a target image by intersecting the target image with a rectangle of the same size as the existing region within the image, where the rectangle has been offset from the existing region by the integer shift calculated at step 640. Extracting a new tile may optionally include filtering, for example to remove high or low frequencies. An example tile extraction calculation is shown in FIG. 7, using a target image 700.

Next, in step 670, the overlaid tile selected by step 650 is multiplied element-wise by the tile obtained by step 660. If steps 650 and 660 calculated sub-regions for tiles they obtained, then the element-wise multiplication is restricted to those sub-regions.

Next, the multiplied elements from step 670 are aggregated in step 680, preferably by summing them, thus forming a complex aggregation 682. The aggregation 682 may be considered an example of a matching parameter value for the two tiles. The combination of steps 670 and 680 may be considered a comparison between the two tiles.

Step 690 identifies a component tile of the overlaid tiles 610, using the phase $\phi$ of the complex aggregation value 682 from step 680 and the phase mapping 615, by mapping the phase $\phi$ of the aggregation 682 to a component tile of the set of tiles 610. The phase $\phi$ of the aggregation 682 may also be considered a matching parameter value for the comparison of the two tiles. Step 690 thereby operates to identify a component tile within the target image by determining that the embedded parameter value of the component tile is the closest of the embedded parameter values, of the set of tiles 610, to the matching parameter value. The aggregation 682 is a complex number, and thus in addition to the phase $\phi$, there is an associated magnitude value. In a specific implementation, the magnitude value may be used in the identification step 690 to determine a confidence of matching between the tiles.

A variation on process 600 is now described, for when the disambiguating information is encoded in the pattern used to assign pixels from component tiles to the overlaid image. This form of disambiguating information is described earlier, with reference to FIGS. 11A and 11B.

This variant process is similar to process 600 as described above, but the one or more overlaid tiles 610 supplied are produced by assigning pixels from component tiles to the overlaid image according to a specified pattern. These overlaid tiles are typically real valued. Also, instead of calculating a single sum at step 680, multiple sums are calculated corresponding to the pattern of assigned pixels. For example, in FIG. 11B, the pattern divides the tile 1110 in half, and so here two sums would be calculated. Each sum in the multiple sums is associated with a component tile. A sum associated with a particular component tile uses exactly those elements multiplied at step 670 that intersect pixel locations that were assigned values from that component tile, according to the specified pattern.

Step 690 in this variant of process 600 identifies a component tile by comparing values of the multiple sums produced at step 680, selecting the component tile associated with the largest sum value. The phase mapping 615 is not used in this variant of the process 600.

FIGS. 7 and 8 illustrate how, given a shift from an overlaid tile to a target tile, either a new target tile can be selected or sub-regions of an existing target tile and overlaid tile can be calculated. The resulting tile or tile sub-regions should contain the same or similar data to at least one of the component tiles of the overlaid tile.

In FIG. 7, a new region 720, from which a new target tile can be extracted, is calculated within a larger image 700. An existing region 710 contains target data. The new region 720 is offset from the existing region 710 by a (preferably integer valued) shift 730, being the estimated shift (e.g. 352) determined previously from the overlaid tile to the target. The shift may alternatively be known, instead of being estimated. The new region 720 is the same size as the existing region 710. A tile extracted from the new region 720, optionally filtered, can be used to identify a component tile by summing the element-wise multiplication of the extracted tile with an overlaid tile, then mapping the result to a component tile.

In FIGS. 8 and 9, a sub-region 810 of a target tile 800 and a sub-region 815 of an overlaid tile 805 are calculated. Sub-region 810 is calculated by offsetting 820 a rectangle (shown in dashed lines) of the same size as the target tile 800 from the position of the target tile 800, and intersecting the rectangle with the target tile 800. This offset 820 is the previously determined (preferably integer valued) shift from the overlaid tile 805 to the target tile 800. Sub-region 815 is calculated by offsetting 825 a rectangle (shown in dashed lines) of the same size as the overlaid tile 805 from the position of the overlaid tile 805, and intersecting the rectangle with overlaid tile 805. This offset 825 is the (preferably integer-valued) shift from the target tile 800 to the overlaid tile 805, and, as such, is the negation of offset 820. The two sub-regions 810 and 815 can be used to identify a component tile by summing the element-wise multiplication of the extracted tile with an overlaid tile, then mapping the result to a component tile. From FIGS. 8 and 9 it will be appreciated that the overlaying was performed using only a part of the component tiles. Typically, whole component tiles form the overlaid tile, but only part of the resulting overlaid tile is used. FIGS. 8 and 9 for example illustrate using part of an overlaid tile, regardless of how that tile was formed.

Example(s)/User Case(s)

A useful application of using overlaid tiles for shift estimation is to efficiently calculate shift estimations in the presence of large translations. This may occur, for example, in images acquired from a scanning laser ophthalmoscope. This device reflects laser light off the retina of a patient and direct it to a pixel sensor to measure the amplitude of the light. By continually scanning the laser and acquiring the light, a two-dimensional video sequence of a small region of the eye can be obtained. However, the eye can exhibit large rapid movements, which can result in large translations between frames in the video sequence.

In the presence of large translations, shift estimation operation can be expensive. Significantly, enough data must be supplied to the shift estimation operation to cover the maximum expected shift. In prior art solutions, this means using either large tiles, which can be computationally expensive, high-quality downsampling, which is also computationally expensive, or low-quality downsampling, which can result in poor shift estimation accuracy.

A way of improving the speed of large-translation shift estimation, while maintaining good shift estimation accuracy, is to form an overlaid tile using spatially close regions of a reference image as component tiles. This is particularly effective if the data in each region forming the overlaid tile is sparse relative the other regions forming the overlaid tile. A shift estimation is then performed, using the overlaid tile and a tile extracted from the target image. The component tile corresponding to the shift estimation is identified, using methods described in this disclosure, and the resulting shift estimation is adjusted by the original position of the component tile. This shift estimation method is generally able to extend the translation range, at substantially the same computational cost, over prior art shift estimation techniques using the same sized tiles as the overlaid tile and target tile. Note that correlation-based shift estimation may return multiple peaks, depending on shift of the target image relative to the reference image, where each peak is associated with one of the component tiles. In this case, the strongest peak is preferably used. The methods presented in this disclosure can equally be applied to any or all of the peaks.

Figure 10A:
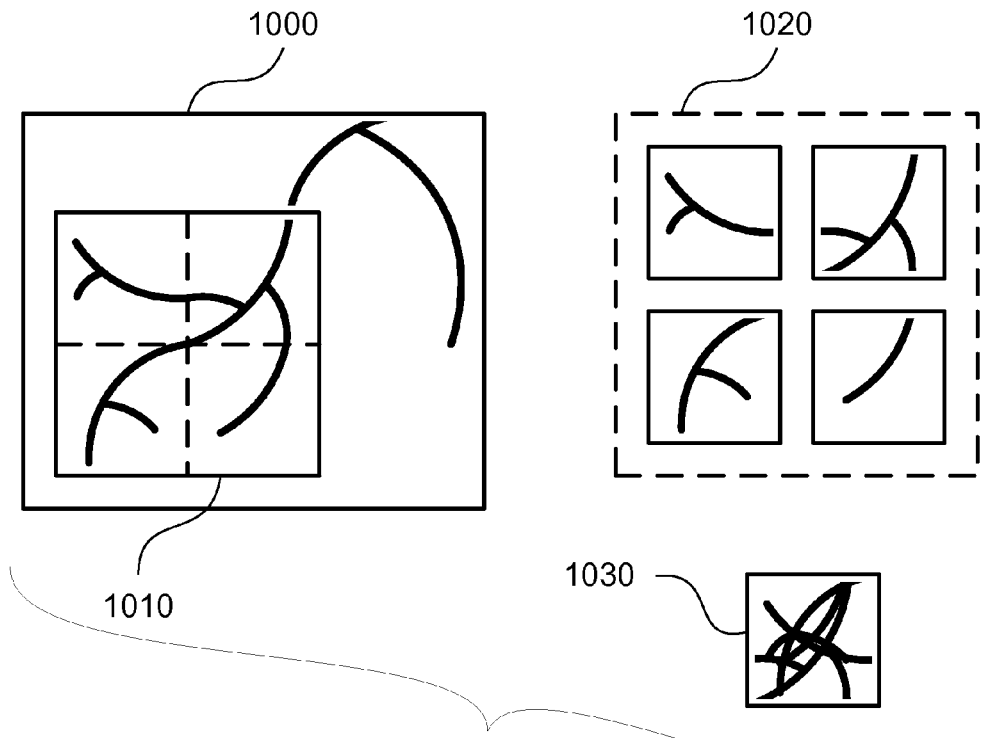
FIGS. 10A and 10B show an example use of shift estimation and tile identification for performing shift estimations in the presence of large translations.
Figure 10B:
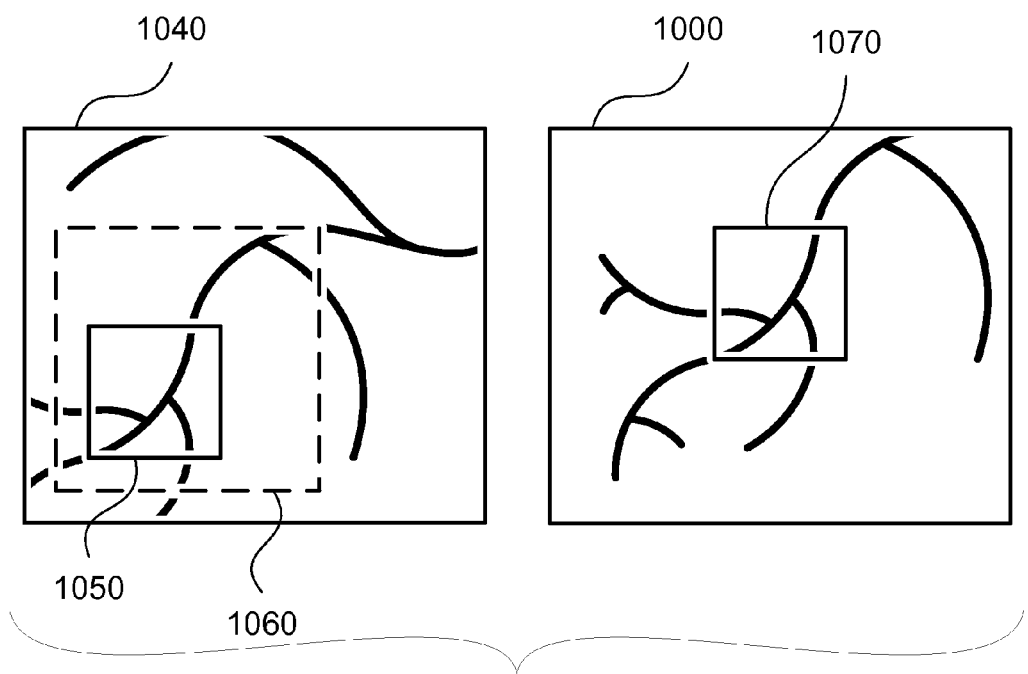

An example large translation estimation is shown in FIGS. 10A and 10B.

FIG. 10A shows a reference image 1000, a collection of distinct component tiles 1020 extracted from that image 1000 and an overlaid tile 1030 formed from the component tiles 1020. Reference image 1000 contains a sub-region 1010, to be used for shift estimation. The sub-region 1010 is divided into 4 spatially close regions. These 4 spatially close regions are extracted from image 1000 to form the collection of tiles 1020. The extracted tiles may be filtered, as described elsewhere in this disclosure.

The overlaid tile 1030 is formed from the component tiles 1020, preferably by the process 100.

FIG. 10B shows a target image 1040 and the reference image 1000.

A sub-region 1060 of target image 1040 indicates a search area for shift estimation. If Fourier-based correlation techniques are used for shift estimation, the search is jointly defined by the size of a reference tile, which in this example is the overlaid tile 1030, a target tile, and the padding on both reference and target tiles. Shift estimation is performed between the overlaid tile 1030, and either the sub-region 1060 of the target image 1040, or a tile (not illustrated) extracted from target image 1040 that partly represents the sub-region 1060.

A sub-region 1050 of target image 1040 is a region centred on the shift estimation between the sub-region 1060 and overlaid tile 1030, sourced from the centre of the sub-region 1060. The sub-region 1050 represents data in the target image 1040 within the sub-region 1060 that is closest, according to the shift estimation operation, to data within one of the component tiles 1020 of overlaid tile 1030.

Using a method described in this disclosure, such as process 400 or process 600, a component tile of overlaid tile 1030 is identified. The identified component tile is located within the reference image, shown in FIG. 10B as region 1070. Preferably, the location of each component tile within the reference image is recorded during the extraction of component tiles. The origin of the shift, calculated from the reference image 1000 to the target image 1040 using the overlaid tile 1030, is adjusted to be within the identified region 1070. Preferably, the shift origin is adjusted to be centred within the identified region 1070.

Note that in the application illustrated in FIGS. 10A and 10B, the reference image and target image are interchangeable, and a shift estimation can be performed between a non-overlaid reference tile and an overlaid target tile.

A similar application where this may be appropriate is locating a small image containing data the same or similar to a sub-region of a larger image within the larger image. Here, multiple sub-regions of the larger image are overlaid to form a tile of suitable size for shift estimation with the smaller image. In this application, the smaller image may be a narrow-field image acquired using a scanning laser ophthalmoscope at high magnification, and the larger image a wide-field field image acquired using a scanning laser ophthalmoscope at lower magnification, after scaling at least one of the two images to make both at a substantially equivalent pixel resolution.

INDUSTRIAL APPLICABILITY

The arrangements described are applicable to the computer and data processing industries and particularly for pattern matching by identifying tile content in images where ambiguity of content may be present. When computer implemented, the identified tile may be reproduced or otherwise represented on a display device, such as the display 1214.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A computer implemented method for identifying a component tile within a target image, said method comprising:

receiving a plurality of distinct component tiles;

overlaying the plurality of component tiles to form an overlaid image, said overlaying being based on an embedded parameter value for each component tile;

comparing the target image with the overlaid image to determine a matching parameter value; and identifying a component tile within the target image by determining that the embedded parameter value of the component tile is the closest of the embedded parameter values to the matching parameter value.

2. A method according to claim 1, wherein the parameter values comprise phase components.

3. A method according to claim 1, further comprising associating a parameter range with the embedded parameter value, and the identifying comprises using the parameter range to determine which embedded parameter value is closest to the matching parameter value.

4. A method according to claim 3, further comprising associating a range of parameter values with the embedded parameter values using a mapping from real space to complex space.

5. A method according to claim 4, wherein the associating is formed by multiplying tile components by a complex number with predetermined phase.

6. A method according to claim 1, wherein the component tiles are located within the target image.

7. A method according to claim 1, wherein the overlaying is performed by averaging the component tiles.

8. A method according to claim 1, wherein the overlaying uses a part of the component tiles.

9. A method according to claim 8, wherein the part of the component tile used for overlaying is determined by shifting.

10. A method according to claim 8, wherein the part of component tile used for overlaying is determined according to a pattern.

11. A method according to claim 1, wherein the comparing comprises element-wise multiplying the target image and the overlaid image, and aggregating the multiplied elements to form the matching parameter value.

12. A method according to claim 1, wherein the comparing comprises correlating the target image with the overlaid image to forma correlation image, and interpolating a peak in the correlation image to form the matching parameter value.

13. A method according to claim 1, further comprising determining a confidence of a matching between the closest embedded parameter value and the matching parameter value using a magnitude value determined by the comparing.

14. A method according to claim 1, wherein the plurality of component tiles are all sourced from a same image.

15. A computer implemented method for detecting a component tile within a target image, said method comprising:
   receiving an overlaid image formed from a plurality of distinct component tiles, said overlaid image having an embedded parameter value associated to each component tile;
   comparing the target image with the overlaid image to determine a matching parameter value; and
   identifying a component tile within the target image by determining that the embedded parameter value associated with the component tile is the closest of the plurality of embedded parameter values to the matching parameter value.

16. A computer-readable storage medium having a program, recorded thereon, the program being executable by a computer to identify a component tile within a target image, said program comprising:
   code for receiving a plurality of distinct component tiles;
   code for overlaying the plurality of component tiles to form an overlaid image, said overlaying being based on an embedded parameter value for each component tile;
   code for comparing the target image with the overlaid image to determine a matching parameter value; and
   code for identifying a component tile within the target image by determining that the embedded parameter value of the component tile is the closest of the embedded parameter values to the matching parameter value.

17. A computer-readable storage medium having a program, recorded thereon, the program being executable by a computer to detecting a component tile within a target image, said program comprising:
   code for receiving an overlaid image formed from a plurality of distinct component tiles, said overlaid image having an embedded parameter value associated to each component tile;
   code for comparing the target image with the overlaid image to determine a matching parameter value; and
   code for identifying a component tile within the target image by determining that the embedded parameter value associated with the component tile is the closest of the plurality of embedded parameter values to the matching parameter value.

18. Computer apparatus comprising:
   a processor,
   a memory coupled to the processor;
   a program stored in the memory and executable by the processor, the program comprising code for identifying a component tile within a target image, said program comprising:
      code for receiving a plurality of distinct component tiles;
      code for overlaying the plurality of component tiles to form an overlaid image, said overlaying being based on an embedded parameter value for each component tile;
      code for comparing the target image with the overlaid image to determine a matching parameter value; and
      code for identifying a component tile within the target image by determining that the embedded parameter value of the component tile is the closest of the embedded parameter values to the matching parameter value; and
   a display for reproducing the identified component tile.

19. A computer implemented method for identifying a component tile within a target image, said method comprising:
   receiving a plurality of distinct component tiles;
   overlaying the plurality of component tiles to form an overlaid image, said overlaying being based on an embedded parameter value for each component tile;
   comparing the target image with the overlaid image to determine a matching parameter value; and
   identifying a component tile within the target image based on the embedded parameter value of the component tile and the embedded parameter values to the matching parameter value.

20. A computer implemented method for detecting a component tile within a target image, said method comprising:
   receiving an overlaid image formed from a plurality of distinct component tiles, said overlaid image having an embedded parameter value associated to each component tile;
   comparing the target image with the overlaid image to determine a matching parameter value; and
   identifying a component tile within the target image based on the embedded parameter value associated with the component tile and the plurality of embedded parameter values to the matching parameter value.

21. A non-transitory computer-readable storage medium having a program, recorded thereon, the program being executable by a computer to identify a component tile within a target image, said program comprising:
   code for receiving a plurality of distinct component tiles;
   code for overlaying the plurality of component tiles to form an overlaid image, said overlaying being based on an embedded parameter value for each component tile;
   code for comparing the target image with the overlaid image to determine a matching parameter value; and
   code for identifying a component tile within the target image based on the embedded parameter value of the component tile and the embedded parameter values to the matching parameter value.

22. A non-transitory computer-readable storage medium having a program, recorded thereon, the program being executable by a computer to detecting a component tile within a target image, said program comprising:

code for receiving an overlaid image formed from a plurality of distinct component tiles, said overlaid image having an embedded parameter value associated to each component tile;

code for comparing the target image with the overlaid image to determine a matching parameter value; and code for identifying a component tile within the target image based on the embedded parameter value associated with the component tile and the plurality of embedded parameter values to the matching parameter value.

\* \* \* \* \*

UNITED STATES PATENT AND TRADEMARK OFFICE
CERTIFICATE OF CORRECTION

PATENT NO. : 9,710,726 B2
APPLICATION NO. : 14/648214
DATED : July 18, 2017
INVENTOR(S) : Allen Peter Courtney and Peter Alleine Fletcher It is certified that error appears in the above-identified patent and that said Letters Patent is hereby corrected as shown below:

On the Title Page

The "(71) Applicants" should be updated as follows:
Applicants: CANON KABUSHIKI KAISHA Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*